United States Patent
Ward

[11] 3,965,989
[45] June 29, 1976

[54] FLEXIBLE PLOW

[75] Inventor: Gerald G. Ward, Naperville, Ill.

[73] Assignee: International Harvester Company, Chicago, Ill.

[22] Filed: Sept. 24, 1973

[21] Appl. No.: 400,487

[52] U.S. Cl. .............................. 172/310; 172/314; 172/316; 172/421; 172/657; 172/695
[51] Int. Cl.² ................... A01B 3/26; A01B 15/14
[58] Field of Search .......... 172/314, 315, 316, 310, 172/421, 473, 613, 695, 657, 658, 714; 280/411, 412

[56] References Cited
UNITED STATES PATENTS

| 911,703 | 2/1909 | Clay | 172/314 X |
|---|---|---|---|
| 1,053,863 | 2/1913 | Paul | 172/314 |
| 1,148,043 | 7/1915 | Paul | 172/658 X |
| 3,321,028 | 5/1967 | Grdenke | 172/456 X |
| 3,321,029 | 5/1967 | Morkoski et al. | 172/328 |
| 3,469,636 | 9/1969 | Kurz | 280/411 C X |
| 3,487,883 | 1/1970 | Newhouse | 172/314 |
| 3,491,836 | 1/1970 | Doepker | 172/456 X |
| 3,635,494 | 1/1972 | Barkstrom et al. | 280/462 |
| 3,731,748 | 5/1973 | Sullivan et al. | 172/314 |

Primary Examiner—J. Reed Fisher
Assistant Examiner—Paul T. Sewell
Attorney, Agent, or Firm—F. David AuBuchon; Floyd B. Harman

[57] ABSTRACT

A large moldboard plow utilizing a multi-piece backbone or main frame connected by a hinge or hinges and a floatation land wheel or wheels. The hinge or hinges being arranged such that a uniform interval is maintained between the last plow bottom on the front section and the first plow bottom on the rear section. The floatation wheel follows the contour of the land which causes flexing of the backbone at the hinge resulting in uniform depth of all bottoms. The hinge or hinges are located to provide a practical line of draft for the rear section thus maintaining balance of the entire unit.

18 Claims, 13 Drawing Figures

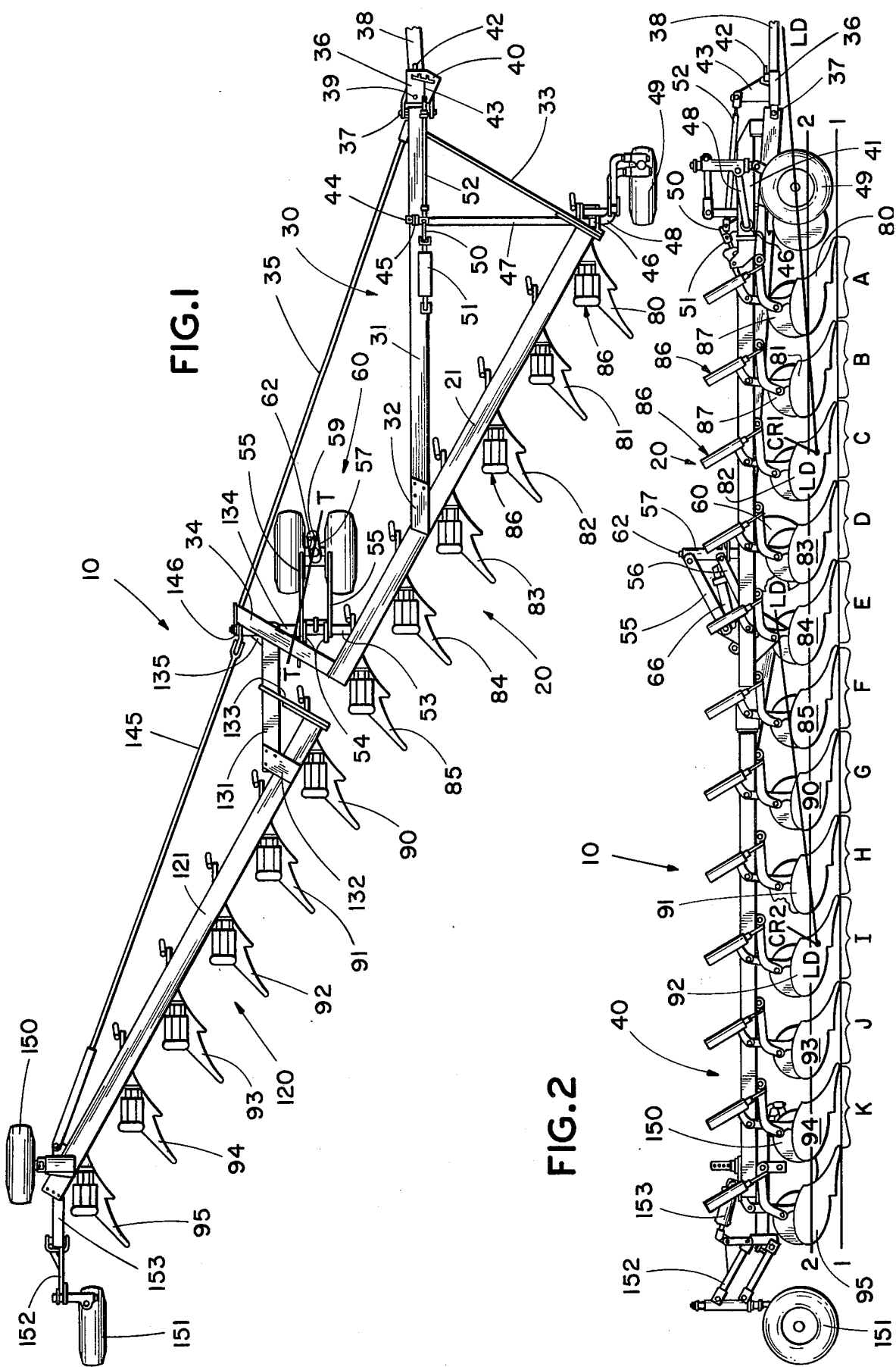

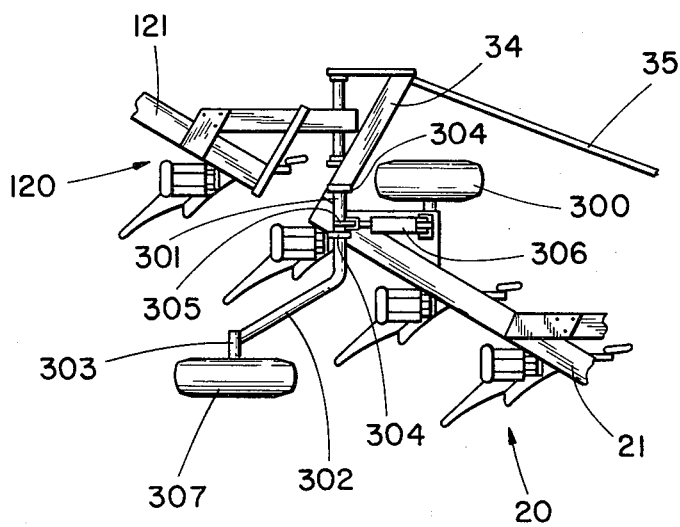
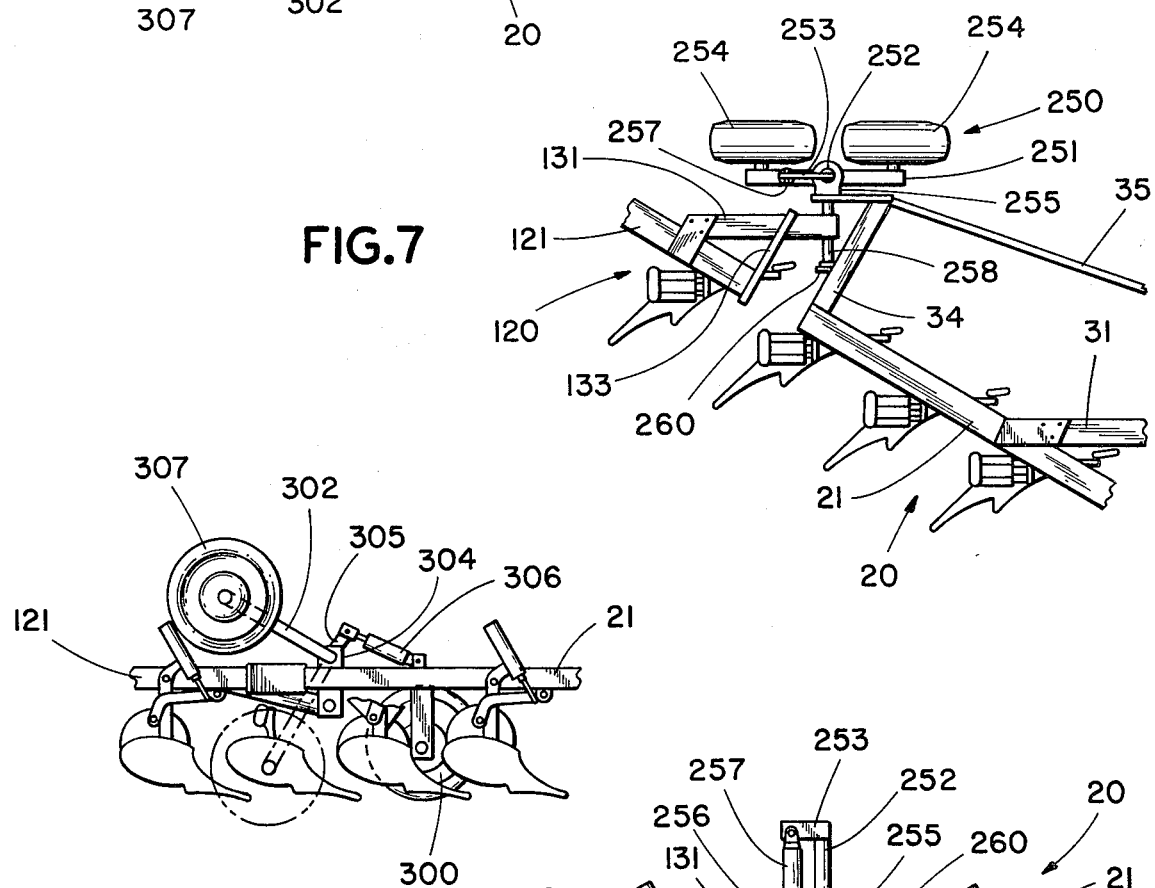
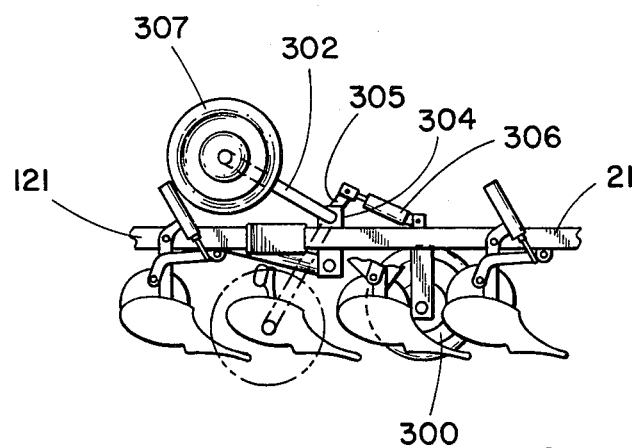
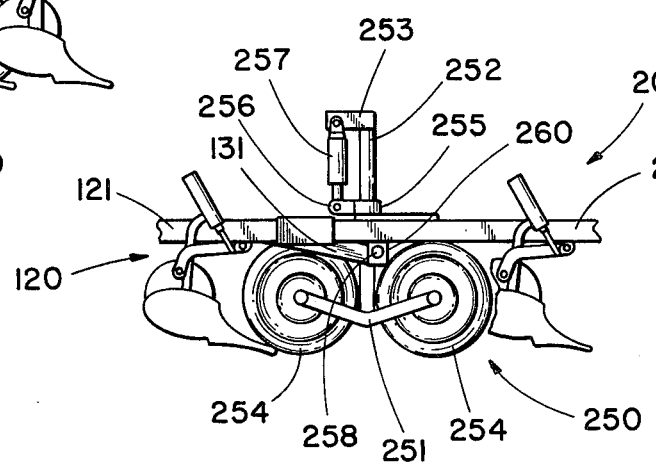

FLEXIBLE PLOW

BACKGROUND OF THE INVENTION

1. Field of the Invention

The subject invention is directed to an earth-working implement of the type having a plurality of earth-working devices and a plurality of ground wheels.

2. Description of the Prior Art

Conventional moldboard plows include a rigid frame member arranged diagonal to the line of travel upon which is mounted a plurality of plow bottoms. It can readily by understood that when the ground contour is uneven some plow bottoms will be working at a greater depth than others and that this is emphasized as the length of the rigid diagonal frame member increases. Thus, there are practical limits to the length of the rigid diagonal frame member. For this reason it is conventional to utilize two or more moldboard plows in tandem when a large number of plow bottoms are desired. Reference is made to the patents of Howard U.S. Pat. No. 2,136,550 of Nov. 15, 1938 and McLaren U.S. Pat. No. 1,018,252 of Feb. 20, 1912 for a showing of tandem mounted plows. In tandem mounting of plows it is possible to provide for equal transverse spacing between the plow bottoms of adjacent units, however, there is a large fore and aft gap between the last plow bottom on the forward unit and the first plow bottom on the rearward unit. The disadvantage of this large gap in the direction of travel becomes most apparent when turning or plowing on a terrace under which condition there is a ridge between the furrow produced by the last plow bottom on the forward unit and the furrow produced by the first plow bottom on the rearward unit. A further disadvantage inherent in the tandem arrangement of moldboard plows is that the overall length of the tandem unit is disproportionately long and is more cumbersome particularly when transporting. Another disadvantage in the tandem arrangement is that they cannot be readily narrowed for transport purposes and if an attempt is made to back up tandem arranged plows it is very difficult to get them to track and they are susceptible to jackknifing.

The patent to Clay U.S. Pat. No. 911,703 of Feb. 9, 1909 discloses a gang plow made up of a two section frame connected by a hinge. The arrangement shown in this patent differs considerably from the construction of a conventional moldboard plow, for example, the plow bottom in the Clay patent are not mounted directly on the diagonal frames but rather are towed behind the diagonal frames by section frames.

BRIEF SUMMARY OF THE INVENTION

Through the use of the subject invention a moldboard plow with an increased number of plow bottoms having the characteristics of more consistent plowing depth in rolling fields, excellent field manueverability and superior transport can now be produced. The main frame or backbone of the plow is divided into two sections and connected by a hinge. The diagonally arranged sections of the backbone or main frame are aligned and the plow bottoms carried by these sections are arranged such that a uniform spacing is established between the plow bottoms in both the direction of travel and in the direction transverse to the direction of travel. This arrangement of the plow bottoms insures a level field when turning, plowing along a contoured terrace, or over uneven or undulating fields. The line of draft of the rear section passes through the pivot connecting the rear section to the front section and thus the rear section is in proper balance thus insuring excellent rough field negotiations. Further, means are provided to swing the hitch mechanism and to angle the center wheels to thus narrow the overall width of the implement for transport purposes which further accounts for superior transport characteristics of the implement.

BRIEF DESCRIPTION OF THE DRAWINGS

FIG. 1 is a plan view of the flexible plow;

FIG. 2 is a side view of the flexible plow;

FIG. 7 is a plan view sketch of another embodiment of the pivot connection;

FIG. 8 is a side view of the embodiment shown in FIG. 7;

FIG. 9 is a plan view sketch of another embodiment of the pivot connection;

FIG. 10 is a side view of the embodiment shown in FIG. 9;

DETAILED DESCRIPTION OF THE INVENTION

Figure 3:
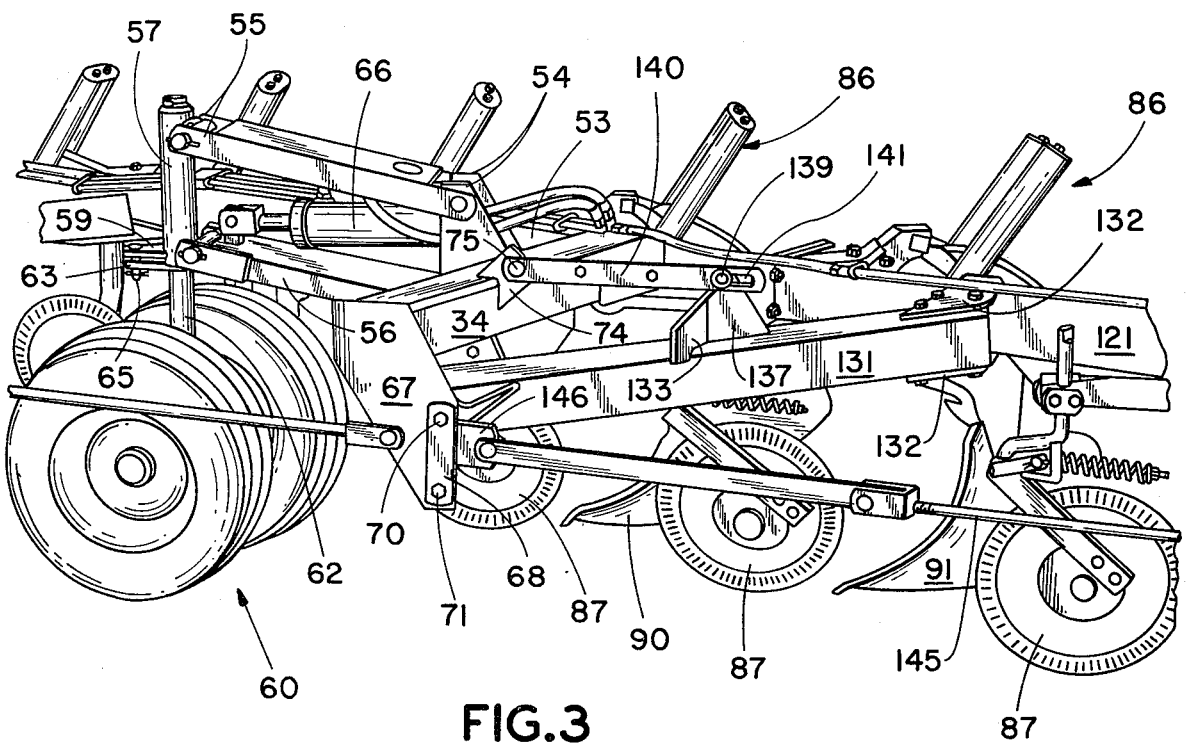
FIG. 3 is an enlarged perspective view taken from the rear of the pivot connection showing the transport lock engaged.

The numeral 10 identifies the entire flexible plow or implement. As can be best seen in FIG. 1, the flexible plow is comprised of a first plow section 20 and a second plow section 120 that are connected by pivot means. The first plow section 20 includes draft means for connection to the drawbar 11 of a tractor 2. (See FIG. 6).

The first plow section 20 includes a first elongated diagonal frame member 21, and its draft means includes a beam 31 that extends in the direction of travel when the plow is operating. The beam 31 is rigidly connected to the first elongated diagonal frame member 21 through plates 32. A brace member 33 rigidly connects the forward ends of beam 31 and first elongaged diagonal frame member 21. An arm 34 is rigidly connected to the rear end of first elongated diagonal frame member 21 and extends therefrom at a right angle to and in the same plane as the first elongaged diagonal frame member 21. A tie rod 35 connects the free end of arm 34 to the forward end of beam 31.

Figure 6:
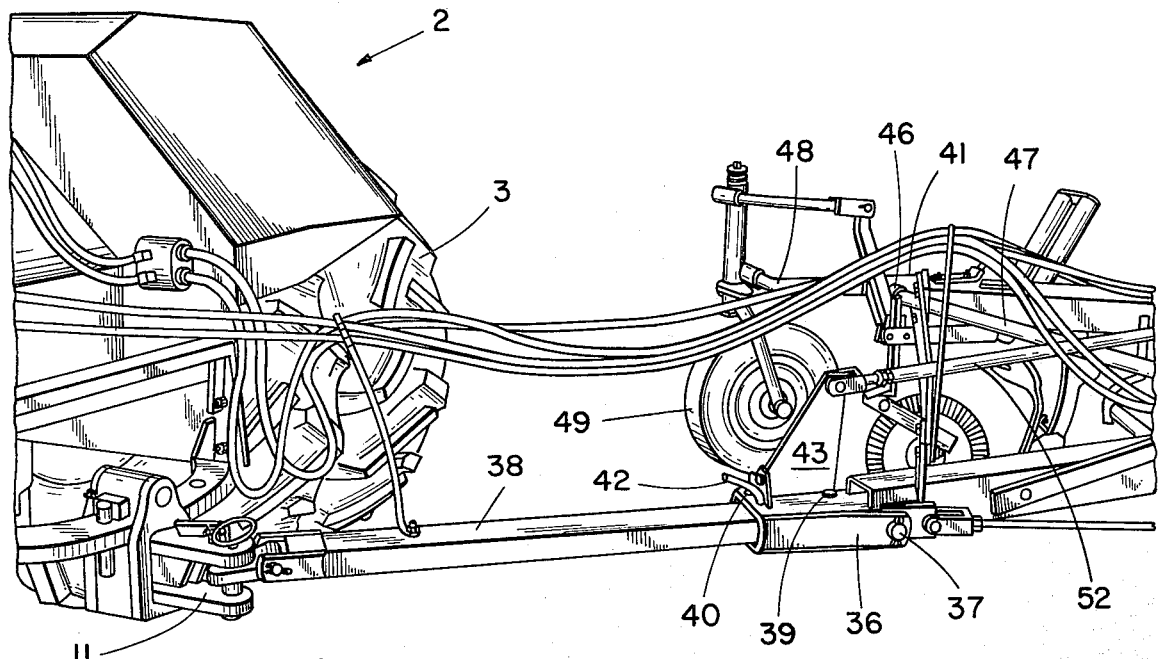
FIG. 6 is a perspective view of the connection between the implement and the tractor drawbar.

The means disclosed for connection of the plow frame to the tractor drawbar includes a hydraulic cylinder adopted to hold the frame in a selected fixed position relative to the tractor drawbar and operates to vary the vertical relation of the frame to the drawbar and the relation of at least one of the wheels to the plow frame. The particular connecting means selected for the environment illustrated herein is substantially the same as those which are disclosed in U.S. Pat. No. 3,321,029 granted on May 23, 1967 and entitled HYDRAULICALLY CONTROLLED PLOW. The connecting means are somewhat schematically illustrated in FIGS. 1 and 2 in that some of the non-essential details thereof have been omitted in the interest of clarity. However, for a more complete understanding of the nature of this connecting means reference may be had to such aforementioned U.S. Pat. No. 3,321,029 which by reference thereto is hereby incorporated in and made a part of the present application insofar as it is consistent with the present disclosure. The hitch means disclosed herein may further be adjusted about a vertical axis relative to the plow frame when it is desired to change from operation to transport or vice versa. The particular structure selected for environmental illustration of this feature is substantially the same as that which is disclosed in U.S. Pat. No. 3,635,494 granted on Jan. 18, 1972 and entitled DIAL HITCH LOCK FOR SWINGABLE TRAILER TONGUE. The dial hitch mechanism is somewhat schematically illustrated in FIGS. 1 and 2 and can be better seen in FIG. 6. However, some of the non-essential details thereof have been omitted in the interest of clarity. However, for a more complete understanding of the dial hitch feature reference may be had to such aforementioned U.S. Pat. No. 3,635,494 which by reference thereto is hereby incorporated in and made a part of the present application insofar as it is consistent with the present disclosure. A hitch member 36 (as best seen in FIG. 6) is pivotally connected to the forward end of beam 31 about a horizontal axis by pivot pin 37. A hitch bar 38 is pivotally connected to the hitch member 36 about a vertical axis by pivot pin 39. There are a plurality of apertures 40 formed in hitch member 36 about an arc struck from the axis of pivot pin 39. There is an aperture (not illustrated) formed in the hitch bar 38 that can be aligned with any one of the plurality of apertures 40 as the hitch bar 38 is pivoted about the vertical pivot axis 39. A locking pin 42 is provided for locking the hitch bar 38 relative to the hitch member 36. A mast 43 extends upwardly from the hitch member 36 and a lug 44 that carries a first bearing 45 extends upwardly from the beam 31. There is a plate 41 that extend forwardly from the juncture of the forward end of the first elongated diagonal frame member 21 and the brace member 33. Plate 41 supports a second bearing 46 that is aligned with the first bearing 45. A shaft 47 is supported in the first and second bearings 45 and 46 respectively, and has a right angle leg member 48 that functions as one of the movable links in a four bar linkage that forms the support for the front furrow or ground wheel 49. The shaft 47 has secured thereto a lever 50 in the area adjacent the beam 31. A hydraulic cylinder 51 is connected at one end to the lever 50 and at the other end to the beam 31. Linkage means connects the lever 50 to the mast 43. As is more completely described in the above referred to U.S. Pat. No. 3,321,029 upon actuation of hydraulic cylinder 51 the vertical relationship between the plow frame and the tractor drawbar and the relation of the furrow wheel 49 relative to the plow frame can be adjusted.

Figure 4:
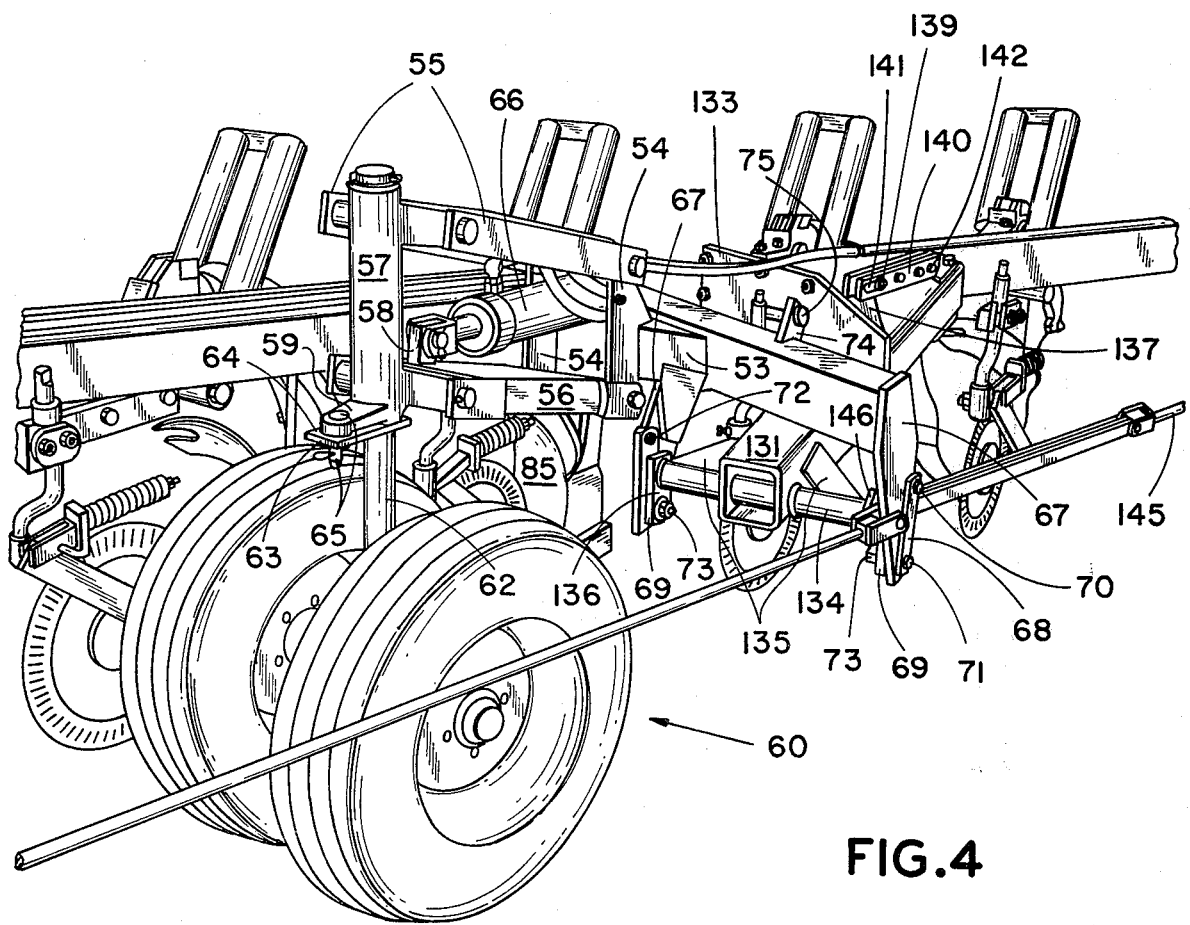
FIG. 4 is an enlarged perspective view taken from the front of the pivot connection showing the transport lock disengaged.

As can be best seen in FIG. 4 a diagonal tube 53 extends from the arm 34 to the first elongated diagonal frame member 21 and functions as a brace and also as a support for a pair of vertically extending plates 54. The vertically extending plates 54 serve as the mounting means for the upper links 55 and the lower links 56 for a set of central ground or floatation wheels 60. The floatation wheels 60 are supported on a vertical spindle 62 that is journalled in a vertical bearing 57. The upper and lower links 55 and 56 are pivotally mounted at their forward ends to the bearing 57. The lower links 56 includes an upwardly extending horizontal lug 58 to which one end of a hydraulic cylinder 66 is connected. The other end of the hydraulic cylinder 66 is journalled on the vertically extending plates 54. Thus the vertically extending plates 54, upper links 55, lower links 56 and the bearing 57 function as a four bar linkage to raise and lower the central ground or floatation wheels 60 in response to actuation of hydraulic cylinder 66. As can be best seen in FIGS. 3 and 4 the bearing 57 has an integral horizontally extending lug 59 with an aperture formed therein. The spindle 62 has a lever 63 rigid therewith having a pair of apertures 64 formed therein. The aperture of lug 59 can be aligned with either of the apertures formed in the lever 63 and a lock pin 65 inserted through the aligned apertures to thus lock the central ground or floatation wheels at a predetermined angle relative to the first elongated diagonal frame member 21. As shall be further discussed one of the settings is used when operating the plow and the other is used when transporting the plow.

As can be best seen in FIGS. 3 and 4, a pair of plates 67 are secured to and extend downwardly from the arm 34. As will be further discussed the second plow section 120 is pivotally connected to this pair of plates 67. Means are provided for vertically adjusting this pivot axis. A pair of outer bars 68 are located on the outer surface of the pair of plates 67. A pair of inner bars 69 are located against the inner surface of plates 67. The outer and inner bars 68 and 69 respectively, are apertured at both ends. Upper bolts 70 extend through the aperture formed in the upper end of outer bars 68 and through one of several apertures (not shown) formed in the plates 67 and through the aperture formed in the upper end of the inner bars 69. Lower bolts 71 extend through the aperture formed in the lower end of outer bars 68 through vertical slots (not shown) formed in plates 67 and through the aperture formed in the lower end of the inner bars 69. Thus the lower bolts 71, that define the pivot axis for the second plow section 120, can be adjusted vertically with respect to the pairs of plates 67. Upper and lower nuts 72 and 73 respectively, are provided to lock the bars 68 and 69 in the selected position. An apertured lug 74 is secured to the arm 34 and receives a locking pin 75 for a purpose that shall be further discussed.

Figure 5:
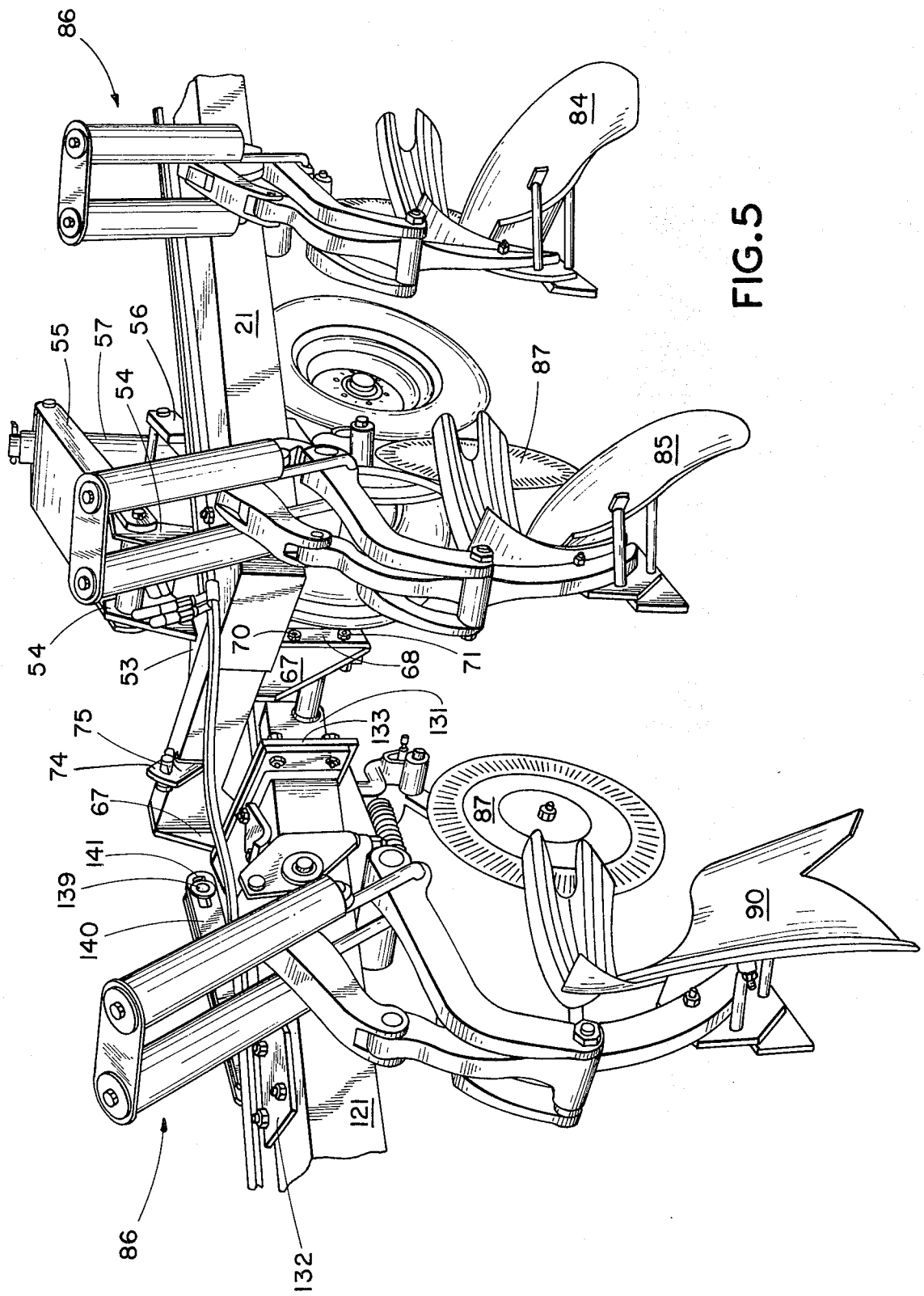
FIG. 5 is an enlarged perspective view taken from the rear of the pivot connection showing the transport lock disengaged.

A plurality of plow bottoms 80 through 85 inclusive are supported by the elongated diagonal frame member 21. The connection between the first elongated diagonal frame member 21 and the plow bottoms 80–85 are the trip mechanisms 86. The trip mechanism selected for illustration herein is substantially the same as those which are disclosed in U.S. Pat. No. 3,321,027 granted on May 23, 1967 and entitled SELF-RESTORING PLOW TRIP. The trip mechanisms are somewhat schematically illustrated in FIGS. 1 and 2 in that some of the non-essential details thereof have been omitted in the interest of clarity. More details are disclosed for example in FIG. 5, however, for a more complete disclosure of the nature of each of these trip mechanisms reference may be had to such aforementioned U.S. Pat. No. 3,321,027 which by reference thereto is hereby incorporated in and made a part of the present application insofar as it is consistent with the present disclosure. Through linkage means such as this the plow bottoms are supported in a working position below and adjacent the diagonal frame means and are mounted for tripping under abnormal draft conditions to avoid damaging the plow by swinging rearwardly and upwardly and then automatically resetting the plow bottom to the operative position. As can be best seen in FIGS. 1 and 2, the plow bottoms 80–85 are mounted on the first elongated diagonal frame member 21 at equal intervals which results in equally spaced furrows in the direction transverse to the direction of travel and also equally spaced intervals between the points of the plow bottoms in the direction of travel. As indicated in FIG. 2 the distances A, B, C, D, and E are all equal. This equal spacing in the direction of travel insures equal spacing between furrows particularly when working on a contoured terrace or making turns. A coltered disk blade 82 has been illustrated in association with each of the plow bottoms.

The second plow section 120 includes a second elongated diagonal frame member 121 that as can be best seen in FIG. 1 is aligned with the first elongated diagonal frame member 21. A tongue 131 is rigidly secured at its rear portions through plates 132 to the second elongated diagonal frame member 121 and extends forwardly and downwardly therefrom. A transverse brace member 133 extends from a mid-portion of tongue 131 to the forward end portion of second elongated diagonal frame 121. The forward free end of tongue member 131 has rigidly secured thereto a transverse tube 134 that is supported by braces 135. Pivot plates 136 are secured as by welding to each end of the transverse tube 134. There are apertures formed in the pivot plates 136 through which the lower bolts 71 extend to thus provide a pivotable connection between the second plow section 120 and the first plow section 20. This pivotable connection is through the axis defined by the lower bolts 71 and it should be noted that this axis is considerably below the plane of the first and second elongated diagonal frame members 21 and 121. There is an upright bracket 137 secured to the upper surface of tongue 131 that is rigidified by welding to the brace member 133. A pin 139 is carried by the upper extremity of the upright brace 137. A transport lock bar 140 having bifurcated ends, a slot 141 formed in one end and an aperture 142 formed in the other end is connected to the upright bracket 137 by the pin 139. Pin 139 extends through the slot 141. During normal operation the bar 1$^{2}$₀ is not used and is carried in the position shown in FIGS. 4 and 5. However, under some unusual circumstances if it is desirable to render the pivot connection between the first plow section 20 and the second plow section 120 substantially inoperative the bar 140 can be moved to the position shown in FIG. 3 wherein the locking pin 75 can be inserted through the aperture 142 and the apertured lug 74. As can be best seen in FIGS. 1, 3 and 4 a tie rod 145 extends from the free end of arm 34 to the rear end of second elongated diagonal frame member 121. The tie rod 145 includes a tie rod plate 146 at its forward end that is apertured to fit over the transverse tube 134 thus permitting it to pivot at this point along with the second plow section 120. Mounted on the rear end of the second elongated diagonal frame member 121 is a conventional gauge wheel 150 that can be adjusted vertically to control the depth of the furrow and engages the ground only during plowing operation. During transport gauge wheel 150 is not in engagement with the ground. A rear transport wheel 151 is also supported through a four bar linkage arrangement 152 on the rear end of the second elongated diagonal frame member 121. A hydraulic cylinder 153 is provided for raising and lowering the rear wheel 151. A plurality of plow bottoms 90 through 95 inclusive, are supported through second linkage means 86 on the second elongated diagonal frame member 121. It should be noted that the linkage means on the second plow section 120 are identical to those used on the first plow section 20. The plow bottoms 90 through 95 inclusive, are spaced along the second elongaged diagonal frame member at equal intervals such that the distances G, H, I, J, K are all equal, and are also equal to distances A through E of the first plow section 20. It should further be noted at this point that the distance F between the plow bottom 85 and plow bottom 90 is also equal to the distances A through E and G through K.

The contour of a conventional plowshare is such that when it is pulled forward it tends to submerge into the ground. In order to balance this downward force to establish a constant furrow depth it is necessary that there be a counteracting force that will permit the plowshare to submerge to the desired depth and stabilize at this point. This counteracting force is conventionally provided by designing into the implement a generally upwardly inclined line of hitch or line of draft. The rudimentary definition of the line of draft or line of hitch is an imaginary straight line which passes from the center of load or resistance of the towed implement through the clevis or hitch to the center of power or where the hitch is attached to the power. If the imaginary straight resistance line passing from the center of resistance the towed implement through the center of power or where the hitch is attached to the tractor is inclined upwardly, then the upward component of this force can be utilized to balance the tendency of a moldboard plow to submerge. The rough rule of thumb used in the design of a conventional moldboard plow, of the type having a diagonal frame supporting a plurality of plow bottoms, is to drop a vertical line at the center of the set of plow bottoms, mark a point on this vertical line up two-thirds of the furrow depth. From this point extend a line forwardly at an inclination in the range of 6° to 12°. The plow should then be connected or hitched to the tractor at a point along this inclined line. If the plow is connected or hitched to the tractor at a point to far above the inclined line then the upper component of force exerted by the tractor will tend to prevent the plowshares from submerging to the desired depth. If the plow was connected or hitched to the tractor by a point below the incline line, then the component of upward force would not be sufficient to prevent the plow from tending to submerging to a deeper depth than desired. It should be noted that this method of defining a line of draft is a general and rough rule of thumb that is affected by numerous factors such as the weight distribution along the beam the presence or absence of a gauge wheel, presence or absence of colter disk blades, presence of hitch balance force mechanisms and varying soil conditions. The most adverse condtiions that a plow encounters is hard soil in which the inherent tendency of the plow bottom is to emerge to a shallow depth. Thus for the most adverse condition it is desirable to have a shallow line of draft. Thus in the design of plows that must perform in various soil conditions a shallow line of draft is designed into the plow particularly where weight transfer is not desirable. This shallow line of draft shall be referred to herein as the practical line of draft. The practical line of draft shall be a line passing through the center of load or resistance at an inclination between 6° to 12° to thus provide a plow section that is operable under most conditions encountered. In FIG. 2 a horizontal line 1—1 indicates the bottom of the furrow and horizontal line 2—2 indicates the ground line. The point CR1 indicates the center of resistance of the first plow section 20. The practical line of draft is illustrated in FIG. 2 for the first plow section 20 inclined at approximately 6½°. This practical line of draft for the first plow section if extended would pass through the connection of the plow to the tractor drawbar. Point CR2 indicates the center of resistance for the second plow section 120. The practical line of draft for the second plow section 120 is illustrated in FIG. 2 and inclines at an angle of approximately 6½°. It should be noted that the practical line of draft for the second plow section 120 extends through the pivot axis between the first plow section 20 and the section plow section 120 established by the lower bolts 71 such that the second plow section 120 is in operating balance. When it is desired to transport the flexible plow 10 the hydraulic cylinders 51, 66, and 153 are all actuated through a hydraulic control valve convenient to the operator on the tractor causing the first and second elongated diagonal frame members 21 and 121 to be elevated over the ground a sufficient distance so that the plow bottoms are above the ground line. It should be noted that because the gauge wheel 150 is fixed in a position to engage the ground line 2—2 when the plow bottoms are operating the gauge wheel will be elevated from the ground line when in transport position. Thus in transport position the entire flexible plow is supported by the three ground-engaging wheels 49, 60 and 151. The front ground-engaging wheel 49 and the rear ground-engaging wheel 151 are free to caster, however, the central ground-engaging wheel 60 is secured in a fixed attitude relative to the first elongated diagonal frame member 21 by the lock pin 65. If transport is to be performed with the flexible plow 10 at an attitude to the direction of travel as indicated in FIG. 1 then pin 65 locks the central ground-engaging wheels 60 in the position such that they are parallel to the beam 31. As can be readily recognized from examinaton of FIG. 1 if the aligned first and second elongated diagonal frame members 21 and 121 were shifted to a shallower angle with respect to the direction of travel the overall width of the flexible plow 10 can be narrowed for transport purposes. If this is desired then pin 65 is removed and central wheels 60 are rotated about the bearing 57 until they are aligned with the line TT in FIG. 1 and the pin 65 is re-inserted through the newly aligned set of apertures. The locking pin 42 is removed and the hitch bar 38 is pivoted about the vertical pivot pin 39 relative to the hitch member 36 until the other aperture 40 is aligned with the aperture in the hitch bar at which time the locking pin 42 is re-inserted. Thus in the narrowed transport condition the first and second elongated diagonal frame members 21 and 121 follow behind the tractor at a much shallower angle relative to the direction of travel which narrows it considerably. Regardless of whether the flexible plow 10 is being transported in the wide condition or the narrow condition the front and rear ground wheels are free to caster while the central ground wheel is not, it being fixed by the lock pin 65.

The transport lock bar 140 shall now be discussed. Referring to FIG. 1 and considering only the first plow section 20 it should be noted that this plow section is supported during transport by the front furrow wheel 49 and the central ground wheels 60. If the first plow section 20 were to be balanced then the center of gravity of this section must lie on a line between the vertical axes of wheels 49 and 60. It is quite apparent from examination of FIG. 1 that the majority of the weight of the first plow section 20 is concentrated behind the imaginary line between the vertical axes of wheels 49 and 60. Thus the first plow section 20 is not balanced and would tend to tip to the rear raising up the hitch bar 38. By swinging the bar 140 from the position shown in FIG. 4 to the position shown in FIG. 3 and inserting locking pin 75 the pivot connection about lower bolt 71 has in effect been eliminated and the first plow section 20 and second plow section 120 now function as one rigid unit. This rigid unit is now supported by three sets of wheels the forward wheel 49, the central wheels 60 and the rear wheels 151. Since the center of gravity of the entire unit is located within the imaginary triangle defined by the vertical axes of these three sets of wheels we now have a stable three wheel vehicle, and the unit can now be moved (transported) independent of the tractor.

Referring now to the embodiment disclosed in FIGS. 7 and 8. In order to avoid repetition of description identical reference numerals have been used for those elements in this embodiment that are the same as the embodiment disclosed in FIGS. 1 through 6 inclusive. New references are used to identify the different structure. A bogey 250, comprising a horizontal beam 251 having a vertical spindle 252 protruding upwardly from its midsection, is supported on the ground by a pair of longitudinally spaced wheels 254. The vertical spindle 252 has an offset tab 253 at its upper end. A bearing member 255 adapted to receive the vertical spindle 252, is connected to the free end of pivot bar 258. An inner brace member 260 carried by the mid-portion of arm 34 supports a bearing (not shown) for journaling a pivot bar 258. The bearing 255 has a protrusion 256 located below the offset tab 253. A hydraulic cylinder 257 is connected at one end to the offset tab 253 and at its outer end to the protrusion 256. Upon actuation of the hydraulic cylinder the spindle 252 moves relative to the bearing 255 thus raising or lowering the vertical spindle 252. This in turn raises or lowers the rear end of first elongated diagonal frame member 21 and the front end of second elongated diagonal frame member 121. It should be noted that although not illustrated means could be provided for either angling or steering the bogey 250. In this embodiment the central ground wheel is carried by the means pivotally connecting the first plow section to the second plow section rather than by the rear portion of the first plow section as in the embodiment of FIGS. 1 through 6 inclusive.

In FIGS. 9 and 10 another embodiment of the central pivot is illustrated. Again in order to avoid repetition of description the same reference numeral has been used for those elements that are identical to corresponding elements in the embodiment of FIGS. 1 through 6 inclusive. New reference numerals have been used to designate the new structure. In this embodiment a fixed gauge wheel 300 is carried by the first elongated diagonal frame member 21 forward of the arm 34. This is a conventional gauge wheel that engages the ground only during plowing operation and can be adjusted vertically to control the furrow depth. A bar 301 is journalled in a pair of bearings 304 carried by the first elongated diagonal frame member 21 and the arms 34. The bar 301 includes an angled end portion 302 that terminates in an axle portion 303. A transport wheel 307 is journalled on the axle portion. A lever arm 305 is fixed to the bar 301 and protrudes upwardly therefrom. A hydraulic cylinder 306 is secured at one end to the first elongated diagonal frame member 21 and at its other end to the free end of lever arm 305. Upon actuation of the hydraulic cylinder 306 bar 301 is pivoted in bearings 304 thus swinging the transport wheel 307 between the plowing and transport positions indicated in FIG. 10. It should be noted that means could be provided for either angling the transport wheel 307 to a transport attitude in a manner similar to that disclosed in the embodiment of FIGS. 1 through 6 or a steering mechanism could be provided. In this embodiment although the transport wheel 307 engages the ground behind the plow bottoms this will only happen when in transport and thus will not interfere in any way with the plowing operation.

Figure 11:
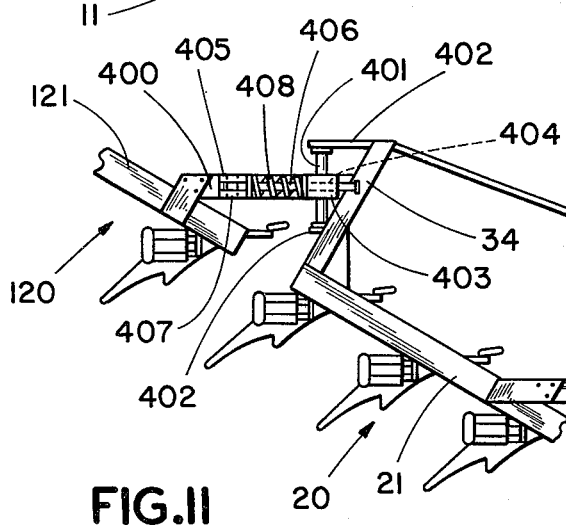
FIG. 11 is a plan view sketch of another embodiment of pivot connection.
Figure 12:
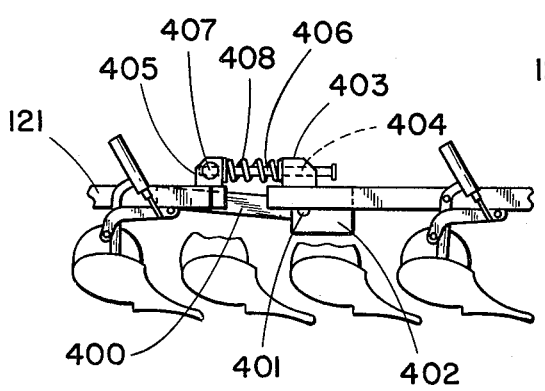
FIG. 12 is a side view of the embodiment disclosed in FIG. 11.

In FIGS. 11 and 12 still another embodiment of the pivot connection between the first plow section 20 and second plow section 120 is illustrated. Again in order to avoid repetition of description the same reference numerals are used in these figures as used in the embodiment disclosed in FIGS. 1 through 6 for those elements that are the same. Different reference numerals are used for the new elements. In this embodiment the tongue 400 extending forwardly from the second elongated diagonal frame member 121 is at a shallower angle to the horizontal than is the tongue of the embodiment of FIGS. 1 through 6 inclusive. Tongue member 400 has a transversely arranged pivot bar 401 at its forward end that is pivotally connected to a pair of plates 402 carried by the bar 34 of the first plow section 20. The pivot connection in this embodiment between the first and second plow sections 20 and 120 respectively is higher than the pivot connection in all previous embodiments resulting a deeper line of draft and one that would normally be unacceptable. In this embodiment there is a lug 403 carried by the arm 34 having a longitudinally extending bore 404 formed therein. A lug 405 protrudes upwardly from the tongue 400 and a rod 406 is connected to lug 405 by pivot means 407. The other end of rod 406 extends through the bore 404. A compression spring 408 is carried by the rod 406 and engages both lugs 403 and 405. The spring 408 is designed to exert a force on lug 405 causing the second plow section 120 to pivot downwardly about the pivot bar 401. This downward force exerted by the spring 408 is designed to balance the second plow section 120 so that the plowshares will submerge and stabilize at the desired depth.

Figure 13:
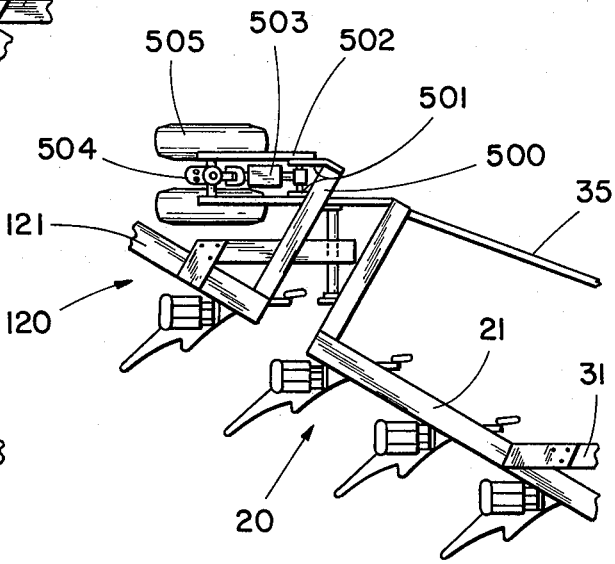
FIG. 13 is a plan view sketch of another embodiment of the pivot connection.

In FIG. 13 another embodiment of the pivot connection between first plow section 20 and second plow section 120 has been illustrated. Again in order to avoid repetition of description the same reference numerals have been used on this embodiment for those elements that are the same as corresponding elements in the embodiment of FIGS. 1 through 6 inclusive. New reference numerals have been used for new elements. In this embodiment an arm 500 is secured to the forward end of the second elongated diagonal frame member 121 extending at a right angle thereto. A pair of vertically extending plates 501 are secured to the outer end of arm 500. A four bar linkage arrangement 502 and a hydraulic cylinder 503 are provided for mounting a set of central ground wheels 505 on the arm 500 through the vertically extending plates 501. A locking mechanism 504 is provided for fixing the angle of the wheels 505 with respect to the second elongated diagonal frame member 121 for either a wide transport position or a narrow transport position. It should be noted that the mounting of the set of wheels 505 in this embodiment is identical to the mounting arrangement disclosed in the embodiment of FIGS. 1 through 6 and differs only in that they are carried by an arm extending from the forward end of the second elongated diagonal frame member 121 rather than from the rear end of the first elongated diagonal frame member 21.

It should be noted that in all embodiments disclosed a two section implement has been illustrated, however, it is contemplated that additional pivot arrangements could be provided to thus make up three or more section implements. The additional pivot arrangements could be identical in structure to those disclosed in the various embodiments illustrated herein.

The invention is not to be limited to the exact arrangement of parts shown in the accompanying drawings or described in the specification as various changes in the details of construction may be resorted to without departing from the spirit of the invention. Therefore only insofar as the invention has particularly been pointed out in the accompanying claims is the same to be limited.

What is claimed is:

1. A flexible plow including:

a first plow section, said first plow section comprising a first elongated diagonal frame member having a draft means structure including means for hitching to a tractor, a plurality of plow bottoms connected through first linkage means that function to support said plow bottoms in a working position below and adjacent said first elongated diagonal frame member said plurality of plow bottoms being spaced at equal intervals along said first elongated diagonal frame member, said first linkage means functioning when said plow bottoms are in working position to transmit upward forces from said plow bottoms to said first frame member;

a second plow section, said second plow section comprising a second elongated diagonal frame member, a plurality of plow bottoms connected through second linkage means that function to support said plow bottoms in a working position below and adjacent said second elongated diagonal frame member, said plurality of plow bottoms being spaced at intervals along said second elongated diagonal frame member equal to said equal intervals, said second linkage means functioning when said plow bottoms are in working position to transmit upward forces from said plow bottoms to said second frame member, ground wheel means carried by the rear portion of said second plow section;

pivot means connecting the rear of said first elongated diagonal frame member to the front of said second elongated diagonal frame member such that the interval between the last plow bottom on said first elongated diagonal frame member and the first plow bottom on said second elongated diagonal frame member is substantially equal to said equal interval, the practical line of draft for said second plow section passing through the axis of said pivot means.

2. The invention as set forth in claim 1 when means are provided for locking said first elongaged diagonal frame member to said second elongated diagonal frame member to prevent pivoting therebetween about said pivot means.

3. The invention as set forth in claim 1 wherein the pivot axis of said pivot means is below said elongated diagonal frames.

4. The invention as set forth in claim 1 wherein said draft means structure including a beam rigidly connected to said first elongated diagonal frame means and a hitch bar pivotally connected to said beam about a vertical axis and means for adjusting the angular relationship of said hitch bar to said beam and said first elongated diagonal frame member to thus provide a narrower overall width for transport.

5. The invention as set forth in claim 1 wherein a arm is secured to the rear portion of said first elongated diagonal frame member extending outwardly and generally transverse therefrom, a tongue secured to said second elongated diagonal frame member, said tongue extending generally parallel to the direction of travel, said pivot means connecting the free end of said tongue to said transverse arm.

6. The invention as set forth in claim 5 wherein the pivot axis of said pivot means is below said elongated diagonal frame.

7. The invention as set forth in claim 5 wherein ground wheels are carried by said generally transverse arm.

8. A flexible plow including:
a first plow section, said first plow section comprising a first elongated diagonal frame member having a draft means structure secured thereto, said draft means structure including means for hitching to a tractor, said means for hitching to a tractor including means for adjusting the forward end of said draft means structure from a central operating position to a transport position offset from the central operating position, a plurality of plow bottoms connected through first linkage means that function to support said plow bottoms in a working position below and adjacent said first elongated diagonal frame member, said plurality of plow bottoms being spaced at equal intervals along said first elongated diagonal frame member, said first linkage means functioning when said plow bottoms are in working position to transmit upward forces from said plow bottoms to said first frame member, forward ground wheels carried by the forward end of said first plow section;
a second plow section, said second plow section comprising a second elongated diagonal frame member, a plurality of plow bottoms connected through second linkage means that functions to support said plow bottoms in a working position below and adjacent said second elongated diagonal frame member at intervals therealong equal to said equal intervals, and second linkage means functioning when said plow bottoms are in working position to transmit upward forces from said plow bottoms to said second frame member, rearward ground wheel means carried by the rear portion of said second plow section;
pivot means connecting the rear of said first elongated diagonal frame member to the front of said second elongated diagonal frame member, central ground wheels supporting said pivot means, said central ground wheels including means for adjusting their axis relative to the longitudinal axis of said diagonal frame members to preselected operating and transport positions, the practical line of draft for said second plow section passing through the axis of said pivot means.

9. The invention as set forth in claim 8 wherein the pivot axis of said pivot means is below said elongated diagonal frames.

10. The invention as set forth in claim 8 wherein said forward and rearward ground wheels are mounted for castering.

11. The invention as set forth in claim 8 wherein a generally transverse arm is secured to the rear portion of said first elongated diagonal frame member extending outwardly therefrom, a tongue secured to said second elongated diagonal frame member, said tongue extending generally parallel to the direction of travel, said pivot means connecting the free end of said tongue to said transverse arm.

12. The invention as set forth in claim 11 wherein the pivot axis of said pivot means is below said elongated diagonal frames.

13. The invention as set forth in claim 11 wherein said forward and rearward ground wheels are mounted for castering.

14. A flexible plow including:
a first plow section, said first plow section comprising a first elongated diagonal frame member having a connecting draft means structure secured thereto, a plurality of plow bottoms connected through first linkage means to said first elongated diagonal frame member at equal intervals therealong, said first linkage means functioning to support said plow bottoms in a working position below and adjacent said first elongated frame member and to transmit upward forces from said plow bottoms to said first elongated frame member;
a second plow section, said second plow section comprising a second elongated diagonal frame member, a plurality of plow bottoms connected through second linkage means to said second elongated diagonal frame member at intervals therealong equal to said equal intervals, said second linkage means functioning to support said plow bottoms in a working position below and adjacent said second elongated frame member and to transmit upward forces from said plow bottoms to said second elongated frame member, ground wheel means carried by the rear portion of said second plow section adapted to support the rear portion of said second plow section above the ground during transport and operation;
pivot means defining a substantial horizontal pivot axis connecting the rear of said first elongated diagonal frame member to the front of said second elongated diagonal frame member such that the intervals between the last plow bottom on said first elongated diagonal frame member and the first plow bottom on said second elongated diagonal frame member is substantially equal to said equal intervals and said second plow section is in operating balance, said substantially horizontal pivot axis being below said first and second elongated diagonal frame member; and wherein an arm is secured to the rear portion of said first elongated diagonal frame member extending outwardly and generally transverse therefrom, a tongue secured to said second elongated diagonal frame member, said tongue extending generally parallel to the direction of travel, said pivot means connecting the free end of said tongue to said transverse arm.

15. The invention as set forth in claim 14 wherein ground wheels are carried by said generally transverse arm.

16. A flexible plow including:

a first plow section, said first plow section comprising a first elongated diagonal frame member having a connecting draft means secured thereto, a plurality of plow bottoms connected through first linkage means that function to support said plow bottoms in a working position below and adjacent said first elongated diagonal frame member said plurality of plow bottoms being spaced at equal intervals along said first elongated diagonal frame member, said first linkage means functioning when said plow bottoms are in working position to transmit upward forces from said plow bottoms to said first frame member, a first ground wheel carried by the rear portion of said first plow section adapted to support the rear portion of said first plow section above the ground during transport and operation;

a second plow section, said second plow section comprising a second elongated diagonal frame member, a plurality of plow bottoms connected through second linkage means that function to support said plow bottoms in a working position below and adjacent said second elongated diagonal frame member at intervals therealong equal to said equal intervals, said second linkage means functioning when said plow bottoms are in working position to transmit upwardly forces from said plow bottoms to said second frame member, a second ground wheel carried by the rear portion of said second plow section adapted to support the rear portion of said second plow section above the ground during transport and operation;

pivot means connecting the rear of said first elongated diagonal frame member to the front of said second elongated diagonal frame member such that the intervals between the last plow bottom on said first elongated diagonal frame member and the first plow bottom on said second elongated diagonal frame member is substantially equal to said equal intervals and said second plow section is in operating balance; and wherein an arm is secured to the rear portion of said first elongated diagonal frame member extending outwardly and generally transverse therefrom, a tongue secured to said second elongated diagonal frame member, said tongue extending generally parallel to the direction of travel, said pivot means connecting the free end of said tongue to said transverse arm.

17. The invention as set forth in claim 16 wherein the pivot axis of said pivot means is below said elongated diagonal frame.

18. The invention as set forth in claim 16 wherein said first ground wheel is carried by said generally transverse arm.

* * * * *